United States Patent
Joerg et al.

(10) Patent No.: US 6,257,602 B1
(45) Date of Patent: Jul. 10, 2001

(54) SYSTEM AND METHOD FOR CHANGING THE STEERING ANGLE OF A RACK AND PINION STEERING SYSTEM

(75) Inventors: Wolfgang Joerg, Stuttgart; Wolfgang Moeckel, Korntal-Muenchingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/157,406

(22) Filed: Sep. 21, 1998

(30) Foreign Application Priority Data

Sep. 20, 1997 (DE) .............................................. 197 41 619

(51) Int. Cl.$^7$ ...................................................... B62D 7/16
(52) U.S. Cl. ............................... 280/93.514; 280/93.511; 180/437
(58) Field of Search .............................. 280/93.514, 93.5, 280/93.515, 93.511; 180/434, 440, 436, 437; 74/579 R; 403/117

(56) References Cited

U.S. PATENT DOCUMENTS

| 3,693,999 | * | 9/1972 | Wood, Jr. | 280/93.5 |
| 3,938,822 | * | 2/1976 | Guerriero | 280/93.5 |
| 4,536,003 | | 8/1985 | Maurer et al. | 280/95 R |
| 4,653,773 | * | 3/1987 | Graft | 280/93.514 |
| 4,660,845 | * | 4/1987 | Herr | 280/93.514 |
| 4,970,943 | * | 11/1990 | Salg et al. | 180/434 |
| 5,094,312 | * | 3/1992 | Hakel | 280/93.514 |
| 6,047,977 | * | 4/2000 | Brokholc | 280/93.5 |

FOREIGN PATENT DOCUMENTS

| 25 04 891 | | 12/1976 | (DE) . | |
| 29 02 053 | | 8/1979 | (DE) . | |
| 32 05 979 | | 9/1983 | (DE) . | |
| 195 23 568 | | 1/1996 | (DE) . | |
| 0470424A1 | * | 2/1992 | (EP) | B62D/7/20 |
| 2012904 | * | 8/1979 | (GB) | 280/93.5 |

\* cited by examiner

*Primary Examiner*—J. J. Swann
*Assistant Examiner*—F. Zeender
(74) *Attorney, Agent, or Firm*—Crowell & Moring, L.L.P.

(57) ABSTRACT

A device for reducing the steering angle of a rack and pinion steering system for motor vehicles, having a rack which is located between the tie-rods of the wheels to be steered, is connected to these tie-rods, is mounted displaceably in a housing and has radially thickened connecting regions between the ends of the rack and the respectively adjacent tie-rod in which the thickened regions limit the steering angle by striking against the rack housing, is intended to be of simple construction and to be easily retrofitted. In particular, retrofitting is not intended to require any readjustment and measurement of the track of the steered wheels. To this end, this device includes at least two approximately U-shaped spacer clips and retaining regions on the rack adjacent the radially thickened connecting regions. The retaining regions accommodate attachment of the spacer clips with direct contact between one of the clips and a respective radial thickened region.

6 Claims, 2 Drawing Sheets

SYSTEM AND METHOD FOR CHANGING THE STEERING ANGLE OF A RACK AND PINION STEERING SYSTEM

BACKGROUND AND SUMMARY OF THE INVENTION

This application claims the priority of German Patent Application No. 197 41 619.5, filed Sep. 20, 1997, the disclosure of which is expressly incorporated by reference herein.

The invention relates to a system and a method for changing, particularly reducing, the steering angle for rack and pinion steering systems for motor vehicles.

In the case of a production vehicle, the limiting of the steering angle is designed for a specified and largest standard tire fit. In the case of a vehicle with front-wheel drive, snow chains that are fitted are also considered in this case. In order to keep the turning circle of a vehicle small, the safety margin when the full steering lock is applied is kept as small as possible.

If the owner or user of a vehicle wishes to fit a tire system in which the tires are broader than the maximum size allowed for the standard steering angle limit, then it is necessary to reduce the maximum travel of the rack and pinion steering system, in order to prevent interference between the broader tires and adjacent vehicle components when the wheels are steered.

Such a change in the travel can be achieved by built-in adjustment devices. Such adjustment devices are known, for example, from German patent document DE 39 00 937 A1 and European patent document EP 0 470 424 A1. However, those known adjustment devices are of complex design, and are thus costly.

It is also known for the travel of a rack and pinion steering system to be reduced by fitting a spacer disk. The spacer disks are in each case fitted into the joint between the rack end and the respectively adjacent tie-rod. However, in this case, the joint has to be opened to fit the spacer disk, which is not only time and labor intensive, but also requires the tracking of the steered wheels to be reset and measured.

Therefore, there is a need for an improved system and an improved method for changing the steering angle for rack and pinion steering systems for motor vehicles. In particular, there is a need for a system and a method for changing the steering angle for rack and pinion steering systems for motor vehicles which are relatively simple, have relatively low component costs, require minimal efforts to implement, and in which re-adjustment and measuring of the steering track are unnecessary.

These and other needs have been met according to the present invention by providing a system for adjusting a steering angle of a rack and pinion steering system for a motor vehicle, comprising: a rack located between tie-rods of wheels to be steered, said rack being connected to said tie-rods, said rack being mounted displaceably in a housing and having radially thickened connecting regions between ends of the rack and the respective tie-rods, said thickened regions limiting the steering angle by abutting against the housing, said rack having flattened retaining regions adjacent each of said thickened regions; and at least two approximately U-shaped spacer clips mounted on said rack at said radial thickened regions.

These and other needs have also been met according to the present invention by providing a system for adjusting a maximum steering angle of at least one steerable wheel of a motor vehicle, said system comprising: a rack to be coupled to said at least one steerable wheel, said rack having a radially extending region for engagement with a housing to define a maximum steering angle, said rack having a pair of flattened retaining regions on radially opposite sides adjacent said thickened regions; and at least one generally U-shaped spacer clip mountable on said rack at said radial thickened regions.

These and other needs have also been met according to the present invention by providing a method for adjusting a maximum steering angle of at least one steerable wheel of a motor vehicle having a steering rack coupled to the steerable wheel, said method comprising the acts of: providing a rack having a radially extending region for engagement with a housing to define a maximum steering angle; forming a pair of flattened retaining regions on radially opposite sides of said rack adjacent said thickened regions; and mounting at least one generally U-shaped spacer clip on said rack at said radial thickened regions.

Other objects, advantages and novel features of the present invention will become apparent from the following detailed description of the invention when considered in conjunction with the accompanying drawings.

DETAILED DESCRIPTION OF THE DRAWINGS

Figure 1:
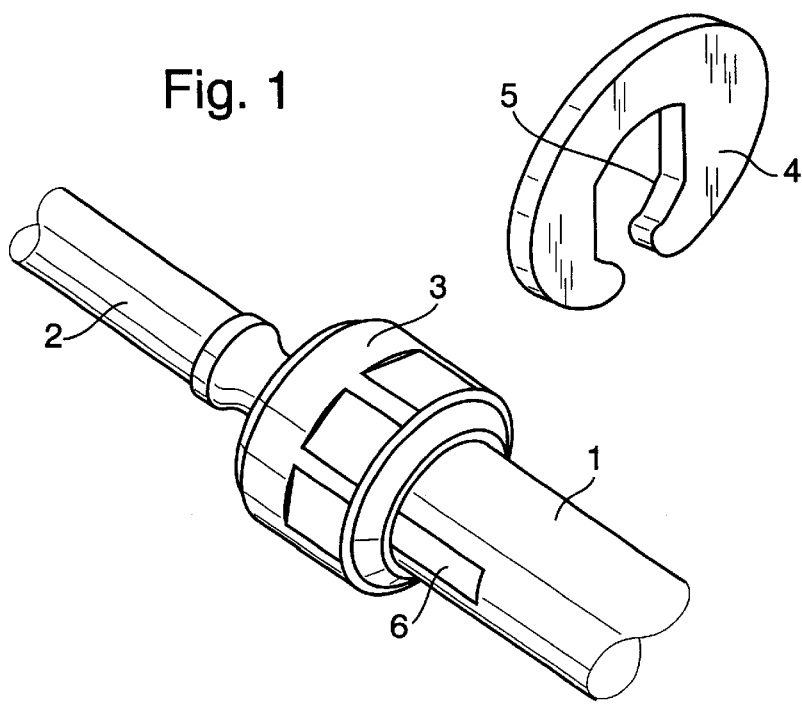
FIG. 1 is a perspective view of a steering rack joint with a tie-rod having a spacer clip which can be fitted thereon, according to a preferred embodiment of the present invention.
Figure 2:
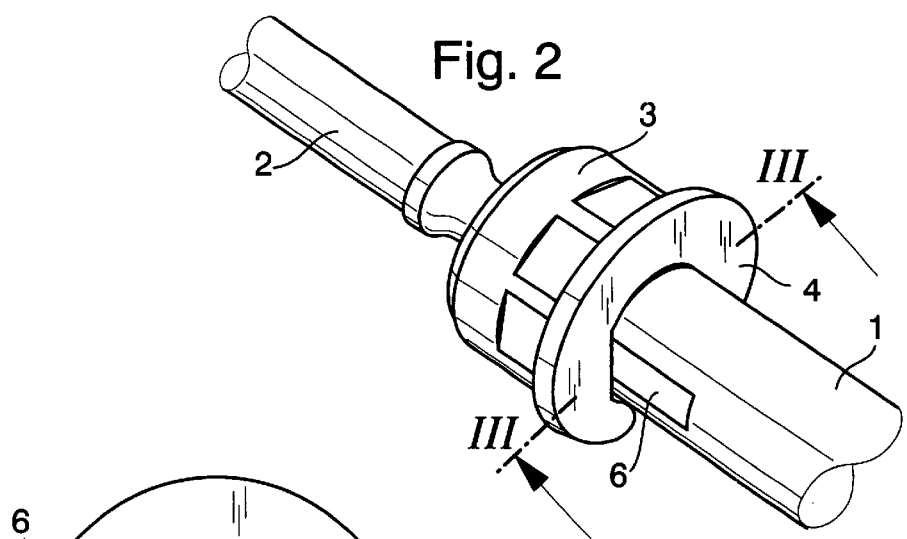
FIG. 2 is a perspective view of the steering rack joint with the tie-rod of FIG. 1 with the spacer clip fitted thereon.

Referring to FIGS. 1–2, a rack 1 of a rack and pinion steering system is connected at each of its two ends to a tie-rod 2, each tie rod being coupled to a wheel to be steered. In FIGS. 1–2, only one end of the rack 1 and one tie-rod 2 are shown. An annular collar 3 is located at each of the two joint points.

Figure 5:
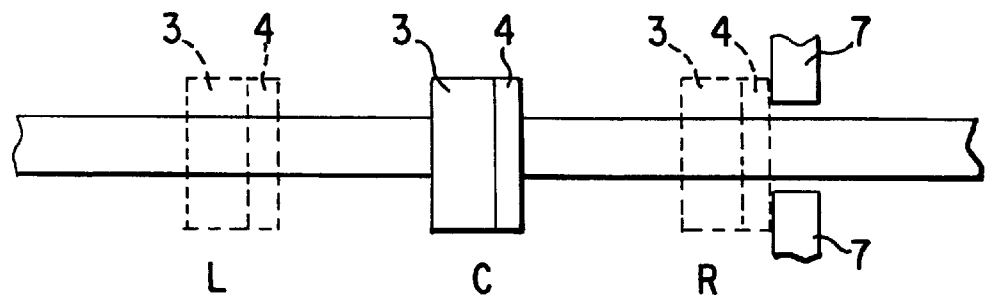
FIG. 5 is a schematic view taken in the direction of arrow V in FIG. 2 showing various positions of the collar and spacer.

The rack 1 is mounted in a housing 7 which is shown schematically only in part in FIG. 5. The housing 7 also contains the drive for the rack 1.

The steering angle is limited by the fact that, in the limit positions, an annular collar 3 in each case abuts against the housing 7 of the rack 1. The maximum steering travel of the rack 1 can thus be reduced in a simple manner by mounting spacer clips 4 at both ends of the rack 1, adjacent the annular collars 3. The amount of reduction is governed by the thickness, or the number, of the spacer clips 4 used.

As schematically shown in FIG. 5, the steerable wheels to which the tie rods 2 are connected are in a straight-ahead position when the collar 3 and spacer clip 4 are in position C. As the steering rack 1 is moved axially such that the collar 3 and spacer clip 4 move toward position R, the steerable wheels accordingly move toward a right-turn position. When the spacer clip 4 contacts the housing 7, the maximum right-turn angle is reached. If a thicker spacer 4 or additional spacers 4 are used, the maximum right-turn angle will be reduced. If a thinner spacer 4 is used, or if the spacer is removed, the maximum right-turn angle will be increased. As the steering rack 1 is moved axially such that the collar 3 and spacer clip 4 move toward position L, the steerable wheels accordingly move toward a left-turn position. The maximum left-turn angle is dictated by the thickness and/or number of spacers 4 used at the opposite end (not shown) of the steering rack 1, where those spacers(s) 4 or the collar 3 (if no spacers are used) will abut the housing 7 as described above.

The spacer clips 4 have a generally U-shaped configuration, and are made of spring steel, or another elastically deformable yet essentially incompressible material. The spacer clips 4 may be formed in various ways, for example by stamping, molding, or machining. The elastic deformability of the spacer clips 4 allows them to be fitted over and around the rack without disassembling the joint between the rack 1 and the tie rod 2. The incompressibility of the spacer clips 4 prevents deformation when the clips abut against the annular collars 3 and abut against the housing, so that a constant steering angle is maintained.

Figure 3:
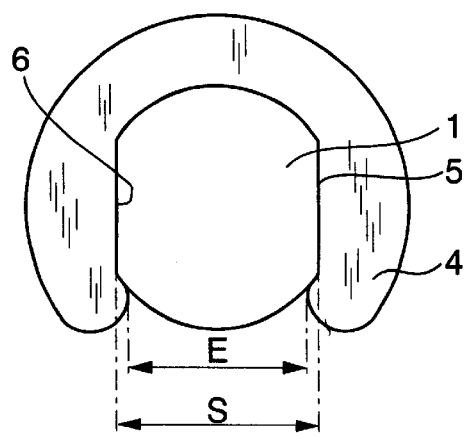
FIG. 3 is an axial view taken along line III—III in FIG. 2.

In the opening region of the U of the spacer clip 4, the region of the gap between the U-legs is constricted, or reduced, in the edge region. As shown in FIG. 3, the size of the gap in the constricted region is E, defined by inwardly extending toes 8 at the bottom ends of the U-legs. Toward the interior of the U, the U-legs are contiguous with a linear region 5, in which case these regions run parallel to one another on the two U-legs. The gap width in the section formed by the linear regions 5 is denoted by S in the drawing, and is larger than the gap width E.

In order to accommodate the linear regions 5 of the U-legs of the spacer clips 4, complementary flattened regions or retaining regions 6 are provided at the ends of the rack 1, which is otherwise cylindrical. The complementary design of the flattened retaining regions 6 with respect to the linear regions 5 results in the clips 4 being continuous like an undercut on the rack 1 when the spacer clips 4 are fitted. In other words, when the spacer clip 4 is fitted over the rack 1, the linear regions 5 of the legs of the spacer clips 4 surround the complementary flattened retaining regions 6 in a positively locking manner, which along with the inwardly extending toes 8 of the U-limbs hold the spacer clips to the rack in a secure manner.

Figure 4:
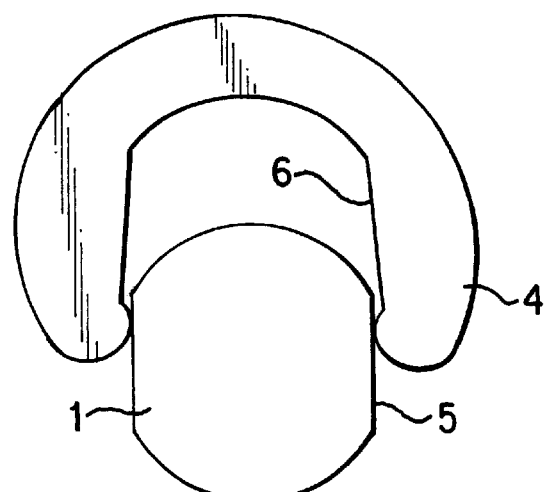
FIG. 4 is a view similar to FIG. 3 showing the spacer clip in an elastically deformed intermediate position as it is being slid over the rack.

The spacer clips 4 are mounted by simply pressing them over the complementary flattened retaining regions 6 of the rack 1. Since the spacer clips 4 are made of an elastically deformable material such as spring steel, they elastically deform to allow the legs of the clip to move outward (i.e., essentially pivoting outwardly away from each other about the closed portion of the U-shape) as the spacer clips are being slid over the complementary flattened retaining regions 6 of the rack 1, as shown in FIG. 4. Once the spacer clips 4 reach the position shown in FIG. 3, the legs elastically return to their original position parallel to each other, as shown in FIG. 3, clamping themselves against the complementary flattened retaining regions 6 of the rack 1. In this way, the spacer clips 4 can be easily installed on, or removed from, the steering rack 1 to adjust the maximum steering angle as desired, without needing to disassemble the joint between the steering rack 1 and the tie rod 2, or re-adjust and measure the steering track.

By combining spacer clips of different thicknesses, different steering angle limits can be achieved in a very simple manner. In particular once the steering angle has been changed according to the invention, there is no longer any need for readjustment of the front axle. All the work involved in changing the steering angle limit can be carried out with the steering linkage fitted.

The device according to the invention for limiting the steering angle is also highly suitable for mass production, since different travel variations can be achieved very easily on one basic steering link.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for adjusting a steering angle of a rack and pinion steering system for a motor vehicle, comprising:
    a rack located between tie-rods of wheels to be steered, said rack being connected to said tie-rods, said rack being mounted displaceably in a housing and having radially thickened connecting regions between ends of the rack and the respective tie-rods, said thickened regions limiting the steering angle by abutting against the housing, said rack having flattened retaining regions adjacent each of said thickened regions; and
    at least two approximately U-shaped spacer clips mounted on said rack at said radial thickened regions,
    wherein said U-shaped spacer clips each comprise a pair of U-legs, inwardly facing sides of said U-legs defining a pair of parallel linear regions which correspond to said flattened retaining regions, said pair of U-legs further defining a pair of toe portions extending inwardly toward each other at ends of said U-legs opposite a closed portion of the U-shaped spacer clip, said linear regions and said toe portions of said spacer clips engaging said rack in a positively locking manner, and
    wherein said parallel linear regions of said U-legs engage said flattened retaining regions over substantially the entire length of the linear regions which face the retaining regions when the spacer clip is in an assembled position on the rack.

2. A system according to claim 1, wherein the spacer clips are made of spring steel.

3. A system according to claim 1, wherein said spacer clips are mountable on said rack by sliding U-legs of said spacer clips over said flattened retaining regions.

4. A system for adjusting a maximum steering angle of at least one steerable wheel of a motor vehicle, said system comprising:
    a rack to be coupled to said at least one steerable wheel, said rack having a radially extending region for engagement with a housing to define a maximum steering angle, said rack having a pair of flattened retaining regions on radially opposite sides adjacent said thickened regions; and
    at least one generally U-shaped spacer clip mountable on said rack at said radial thickened regions, wherein said spacer clip has first and second U-legs with inwardly facing sides defining a pair of linear regions which correspond to said flattened retaining regions, said pair of U-legs further defining a pair of toe portions extending inwardly toward each other at ends of said U-legs adjacent said linear regions,
    wherein said spacer clip is mountable on said rack by sliding said legs over and around said pair of flattened retaining regions, and wherein said parallel linear regions of said U-legs engage said flattened retaining regions over substantially the entire length of the linear regions which face the retaining regions when the spacer clip is in an assembled position on the rack.

5. Device for reducing the steering angle of a rack and pinion steering system for motor vehicles with a rack located between steering tie rods of wheels to be steered and connected with these tie rods and displaceably mounted in a housing, with radially thickened connecting areas between ends of the rack and the respective articulated steering tie rods in which these thickened areas produce steering angle limitation by striking the rack housing, said device comprising:

at least two approximately U-shaped spacing clips and receiving areas for each of these clips in areas of the rack that abut the radial thickening, with these receiving areas permitting direct contact of one of the clips with the respective radial thickening, wherein the spacing clips are made of elastically deformable essentially incompressible material, wherein each of the spacing clips has a pair of U-legs extending between an open section and a closed section of the clip, said U-legs including parallel clamp sections spaced from one another by a first predetermined distance, wherein the U-legs of each spacing clip have projections which face each other at ends of the U-legs forming the open section, said projections being spaced by a second predetermined distance which is less than the first predetermined distance, wherein the receiving areas of the rack include retaining regions formed to match the clamp sections of the respective spacing clips, wherein the spacing clips are positively mounted on the rack with the clamp sections abutting the rack retaining regions under elastic deformation, and wherein said clamp sections of said U-legs engage said retaining regions over substantially the entire length of the clamp sections which face the retaining regions when the spacing clip is in an assembled position on the rack.

6. Device according to claim 5, wherein the spacing clips are made of spring steel.

* * * * *